April 15, 1941. R. BREUNING 2,238,675
ADJUSTABLE TOOL HOLDER
Filed Dec. 13, 1938
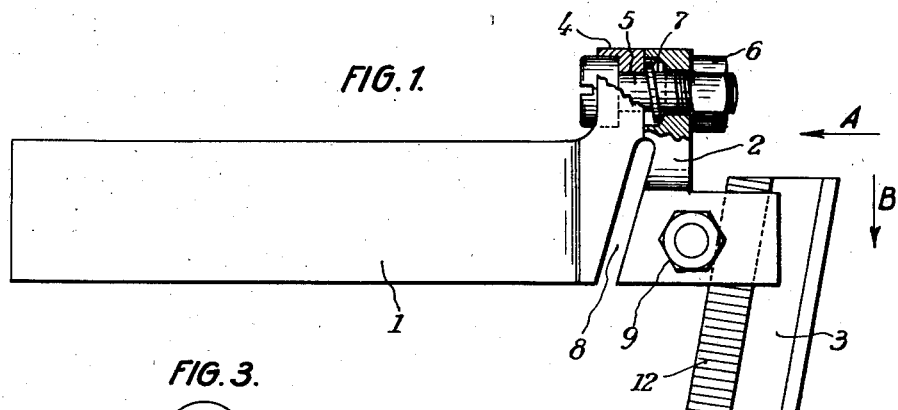
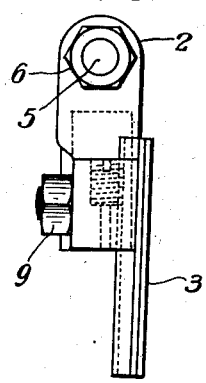
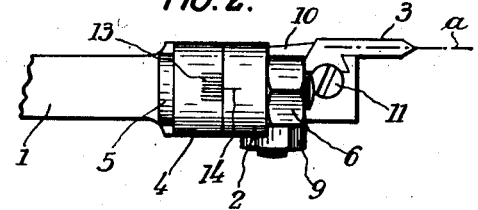
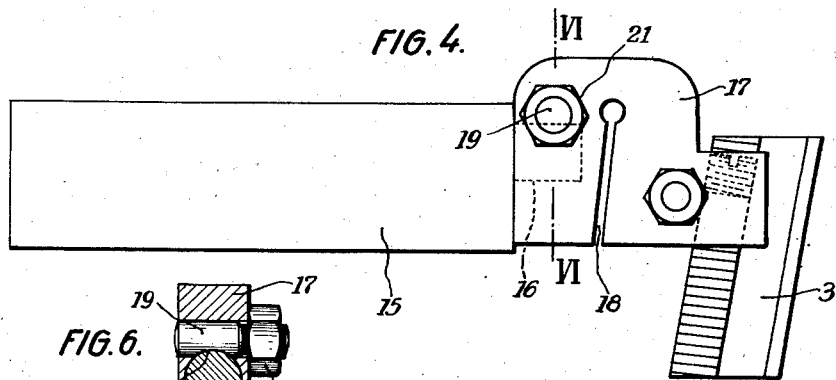
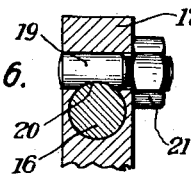
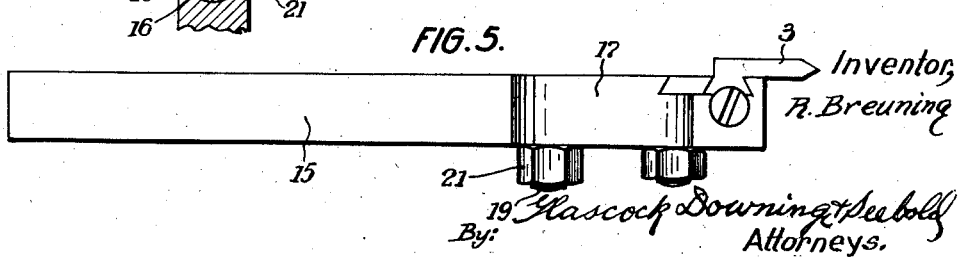
Inventor,
R. Breuning
By: Glascock Downing & Seebold
Attorneys.

Patented Apr. 15, 1941

2,238,675

UNITED STATES PATENT OFFICE 2,238,675

ADJUSTABLE TOOL HOLDER

Robert Breuning, Berlin, Germany

Application December 13, 1938, Serial No. 245,536
In Germany November 2, 1938

4 Claims. (Cl. 29—100)

For screw-cutting it is known to use tools in the shape of section knives. These section knives are taken by an elastic tool holder which is adjustable in order to hold the section knife, according to the respective pitch of the screw, an inclined position to the work-piece. For this purpose the head of a tool holder of known construction was provided with a cylindrical shank inserted in a long split sleeve which is clamped on the slide-rest. The manufacture of this type of tool holder is very expensive, as it is not easy to make a double split sleeve with a long continuous boring in such a way that the long shank of the holder arranged in this sleeve can be turned conveniently for adjusting the holder. It is also to be considered that the head of the holder serving for clamping the section knife and the long cylindrical shank must be made together of highest quality steel, for example of chrome nickel steel, as the head of the holder is strained very much.

In order to obtain the necessary elasticity in a screw-cutting tool holder, a slot must be milled transversely into the head of the holder. As this slot is arranged at right angles to the longitudinal direction of the holder, i. e. to the direction of the grain or to the rolling direction of the material, there is the danger of the head of the split holder breaking off. The replacing of this head is very expensive, as the head and the long cylindrical shank of the holder must be made in one piece of high-quality steel.

The described known type of screw-cutting tool holder also has the disadvantage of inconvenient adjustment. Such a tool holder has to be adjusted to a gauge so that the section knife stands at right angles to the work-piece, and then it must be turned according to the respective pitch of the screw. With the known type of tool holder these two adjustments must be effected simultaneously while the clamping plate of the slide-rest is loosened. In doing this, the one adjustment may be altered when effecting the other.

Placing the holder at an inclined position according to the respective pitch of the screw also causes some difficulties, as the cylindrical shank sticks in the sleeve and can be turned only by jerks.

All the described disadvantages of the mentioned tool holder are obviated by the present invention, according to which the front end of the shank is provided in the direction of the latter with a pivot for carrying the head of the elastic tool holder.

The details of the invention are described in the following in connection with the accompanying drawing showing two embodiments by way of example.

In said drawing—

Fig. 1 is a side view of an adjustable tool holder with a section knife,

Fig. 2 is a partial top view of this tool holder,

Fig. 3 is a front view in the direction A of Fig. 1,

Fig. 4 is a side view of a tool holder according to the invention, in a different construction, Fig. 5 is a top view of this tool holder, and Fig. 6 is a sectional view taken on the line VI—VI of Fig. 4.

According to Fig. 1 the new tool holder consists of a shank 1 and an adjustable head 2 to which a section knife 3 is attached. In the advantageous construction shown in Figs. 1–3 the front end of the shank 1 has an upwardly directed projection 4. In this a screw bolt 5 is inserted, about which the head 2 is pivotable. The head is fixed by means of a nut 6, a spring washer 7 being inserted with advantage between the projection 4 and the head 2, by means of which the friction between the parts held together by the screw bolt 5 is increased in order to prevent the head 2 from turning with regard to the shank clamped on the slide-rest when cutting screws. Instead of the spring washer, it is also possible to use other means for increasing the friction between the parts 4 and 2, for example a fluting.

As will be seen from Fig. 1, a space 8 is left between the head 2 and the shank 1 extending up to the connecting place of these two parts, enabling the head to deflect towards the shank.

The section knife 3 is fixed in known manner to the head 2 by means of a jaw 10 held by a nut 9. After releasing the nut 9, the section knife 3 can be adjusted upwardly by means of an endless screw 11 and screw threads 12 on the knife.

The adjustment of the described tool holder is very simple:

First the tool holder is adjusted with regard to the work by means of a gauge in such a way that the centre line a of the section knife is at right angles to the work-piece. Then the shank 1 of the tool holder is clamped on the slide-rest by tightening the clamping plate. The rectangular adjustment of the section knife with regard to the work-piece is thus final and unchangeable. After this adjustment, the nut 6 is released so that the head 2 can be moved freely and the section knife 3 can be adjusted accurately according to the inclined position required by the pitch of the screw. After this adjustment, the nut 6 is tightened again. Therefore, with the new tool holder the two adjustments are effected successively and without influencing each other. In order to facilitate the adjustment of the section knife 3, a scale 13 in connection with a marking line 14 may be provided on the suitably rounded top of the projection 4 and of the head 2.

The described new tool holder costs considerably less to manufacture than the known type of screw-cutting tool holder. In the manufacture of the new tool holder a comparatively small quantity of high-quality steel is required, as the head 2 is comparatively small. The shank 1 may, of course, be made of a cheaper material. Moreover, the danger of breaking the head of the tool holder is reduced, as the rolling or grain direction of the material of which the head 2 is made, may run in the direction B. Thus, not only the danger of breaking the head is reduced, but at the same time a better elasticity of this head is obtained.

The invention is not restricted to the embodiment shown in Figs. 1–3. For example, the new tool holder may also be constructed according to Figs. 4–6. In this construction the shank 15 is provided with a pivot 16 about which an elastic head 17 is pivotable, having a slot 18 to give the elasticity. In this example the head is attached to the shank by means of a bolt 19 with a groove 20. In shifting the bolt 19 by means of a nut 21, the bolt 19 is clamped on the pivot 16, whereby the head 17 is rigidly fixed to the shank 15.

In order to secure the position of the head of the tool holder with regard to the shank and for adjusting (turning) the head, an endless screw with a corresponding counterthread may be provided according to Figs. 1 and 2 for fixing and adjusting the section knife 3 by means of an endless screw 11 and a thread 12.

What I claim is:

1. An adjustable tool holder comprising a shank, the front end of which is provided with an upwardly directed projection, a screw bolt attached to said projection, a head oscillatable about said screw bolt, means for clamping said head on said bolt, means for clamping a cutter to said head, and means intermediate the two clamping means to accommodate resilient deflections of said head.

2. An adjustable tool holder comprising a shank, the front end of which is provided with an upwardly directed projection, a screw bolt with nut attached to said projection, and a cutter-carrying head oscillatable about said screw bolt and adapted to be clamped on said projection by means of said nut, said head being arranged to accommodate resilient deflections thereof relatively to said shank.

3. An adjustable tool holder, having an elastic head for a screw-cutting tool in the shape of a section knife, consisting of a shank, the front end of which is provided with an upwardly directed projection, a screw bolt attached to said projection, and a head oscillatable about said screw bolt and capable of being clamped on said projection by means of said screw bolt, and a spring washer arranged between said projection and said head.

4. An adjustable tool holder having an elastic head for a screw cutting tool in the form of a section knife comprising a shank the front end of which is provided with an upwardly directed projection, a screw bolt inserted through said projection, an L-shaped head oscillatable about said bolt and forming with said shank a slot extending adjacent to said bolt, a nut on the front end of said bolt for clamping said head in position on the projection, and a clamping device for the section knife arranged below said bolt and perpendicularly thereto.

ROBERT BREUNING.